United States Patent [19]
Kraft et al.

[11] 3,935,149
[45] Jan. 27, 1976

[54] FIRE RETARDANT AQUEOUS EMULSION COPOLYMER ADDITIVES

[75] Inventors: Paul Kraft, Spring Valley; Siegfried Altscher, Monsey, both of N.Y.

[73] Assignee: Stauffer Chemical Company, Westport, Conn.

[22] Filed: Apr. 8, 1974

[21] Appl. No.: 458,626

Related U.S. Application Data

[63] Continuation of Ser. No. 160,905, July 8, 1971, abandoned, and a continuation-in-part of Ser. No. 49,204, June 23, 1970, abandoned.

[52] U.S. Cl.... 260/29.6 TA; 117/137; 117/161 UZ; 117/161 UT; 260/17 R; 260/29.6 H; 260/29.6 MP; 260/884; 260/80.71; 260/87.5 R; 260/87.7
[51] Int. Cl.² C08F 14/22; C08F 30/02; D06M 15/32
[58] Field of Search . 260/29.6 TA, 29.6 MP, 80.71, 260/29.6 H

[56] References Cited
UNITED STATES PATENTS

| | | | |
|---|---|---|---|
| 3,489,706 | 1/1970 | Mikofalvy | 260/29.6 T |
| 3,682,871 | 8/1972 | Mikofalvy | 260/80.71 |
| 3,691,127 | 9/1972 | Kraft et al. | 260/29.6 T |

*Primary Examiner*—Lucille M. Phynes

[57] ABSTRACT

Self-extinguishing polymer compositions are prepared by the intimate admixture of an ordinarily flammable polymer substrate, which may be in the form of an aqueous solution, suspension or most preferably, an emulsion, with an aqueous emulsion or latex of a copolymer of a halogen containing ethylenically unsaturated monomer, such as a vinyl halide, and a phosphorus containing vinyl monomer, particularly a bis (hydrocarbyl) vinylphosphonate. The thus modified polymers display a high degree of flame retardance and are useful in a variety of applications including, for example, as coatings, adhesives, binders, impregnants, laminants and paint bases.

7 Claims, No Drawings

FIRE RETARDANT AQUEOUS EMULSION COPOLYMER ADDITIVES

RELATED APPLICATIONS

This is a continuation of the now abandoned application Ser. No. 160,905 filed July 8, 1971 and a continuation-in-part of abandoned application Ser. No. 49,204, filed June 23, 1970.

BACKGROUND OF THE INVENTION

Copolymers of halogen containing ethylenically unsaturated monomers, such as the vinyl halides, are often prepared as aqueous latices or emulsions in which form they may be conveniently used as coatings, adhesives, paint bases and in various other types of applications. In many instances, particularly where they are being considered for use in building interiors or in use requiring their prolonged exposure to high temperatures, it is highly desirable and advantageous that these vinyl halide copolymer latices should display enhanced fire or flame retardant properties so that they may be safely employed in place of more costly materials.

Prior attempts to provide fire retardant, film forming vinyl halide polymer latices have involved the preparation of various polymeric compositions including copolymer latices of vinyl halides and the alkyl acrylate esters, copolymer latices of vinyl halides and vinylidene chloride and polyvinyl halide latices containing an extraneously added phosphate ester plasticizer. However, none of the latter approaches has proven to be completely satisfactory as the resulting products are found, in many cases, to be lacking sufficient fire retardancy, exceedingly soft, lacking in mechanical stability, readily degradable by ultra-violet radiation or subject to the gradual loss of their extraneously added phosphate plasticizers.

Thus, it is the prime object of this invention to provide novel, fire retardant vinyl halide copolymer latices which may be used in a variety of coating, binding, and laminating applications and which are characterized by their essentially complete freedom from the various disadvantageous properties heretofore associated with this type of product. It is a further object of this invention to provide a novel class of copolymers in the form of aqueous emulsions or latices which are particularly useful, as additives, for preparing fire retardant, polymer compositions which are in the form of aqueous solutions, suspensions or, most preferably, emulsions. Various other objects and advantages of this invention will be apparent from the disclosure thereof which follows hereinafter.

TECHNICAL DISCLOSURE OF THE INVENTION

It its broadest aspect, this invention resides in the discovery that ordinarily flammable polymers, particularly polymers in the form of aqueous solutions, suspension or, most preferably, emulsions, may be rendered fire retardant by the incorporation, therein, of novel additives comprising copolymers of: (1) one or more halogen containing vinyl momoners with (2) one or more pnosphorus containing vinyl monomers as hereinafter defined, these copolymers being in the form of particles in an aqueous emulsion or latex. More particularly, it has now been discovered that the use of aqueous emulsion copolymers of one or more halogen containing vinyl monomers with one or more bis(hydrocarbyl) vinylphosphonates provides the thus modified polymers with a high degree of fire retardance without resulting in any serious deleterious effects upon any of their significant physical properties. Moreover, it is truly surprising and advantageous to find that the polymer blends resulting from the process of this invention, particularly those blends which are in the form of an aqueous emulsion or latex system, display an outstanding degree of compatibility since, as is well known to thse skilled in the art, physical blends of two or more polymers are almost always characterized by their inherently poor compatibility.

The novel copolymers suitable for use as fire retardant additives for ordinarily flammable polymer substrates in the process of this invention comprise aqueous emulsion or latex copolymers of:

1. One or more halogen containing, alpha, beta-ethylenically unsaturated, i.e. vinyl; monomers including vinyl halides such, for example, as vinyl chloride, vinyl fluoride and vinyl bromide; halogenated $C_1$–$C_{12}$ alkyl acrylates and methacrylates such, for example, as methyl alpha-chloroacrylate and methyl alpha-bromoacrylate; vinylidene halides such, for example, as vinylidene chloride, vinylidene bromide, vinylidene chlorobromide and vinylidene fluoride; halo-substituted nitriles of ethylenically unsaturated carboxylic acids such, for example, as alpha-chloroacrylonitrile; and the chlorinated styrenes such, for example, as alpha-chlorostyrene, o-chlorostyrene, m-chlorostyrene, p-chlorostyrene, and 2,4-dichlorostyrene; and 2. one or more bis(hydrocarbyl) vinylphosphonates having the structure:

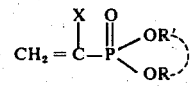

wherein X is selected from the group consisting of hydrogen, halogen, cyano, aryl such as phenyl, $C_1$–$C_{18}$ alkyl and

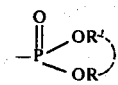

wherein R and R' are hydrocarbyl and substituted hydrocarbyl groups consisting essentially of hydrogen and carbon and containing up to about 18 carbon atoms inclusive with the proviso that R and R' may be the same, different or conjoint, i.e. R and R' may form one single radical.

The use, in this disclosure, of the expression "hydrocarbyl" and "substituted hydrocarbyl groups" refers to the radicals obtained upon the removal of a hydrogen from a hydrocarbon or substituted hydrocarbon group which may be either an aliphatic or aromatic group. These hydrocarbyl groups may be substituted with any non-interfering groups, i.e. with any group which does not interfere with the polymerization of the bis-(hydrocarbyl) vinylphosphonate. Such substituent groups include, for example, chloro, bromo, fluoro, nitro, hydroxy, sulfone, ethoxy, methoxy, nitrile, ether, ester and keto groups and the like.

Illustrative of such aliphatic groups as are represented by R and R' are alkyl groups, such as methyl, ethyl, propyl, butyl, pentyl, hexyl, nonyl, pentenyl, and hexenyl groups and all of their respective isomers; cycloalkyl groups, such as cyclopropyl, cyclobutyl, cyclopentyl, cyclohexyl and cyclohexenyl groups and the like; while typical aryl groups represented by R and R' include phenyl, benzyl, phenethyl, tolyl and naphthyl groups and the like.

Representative of the above depicted bis(hydrocarbyl) vinylphosphonates are:

Bis(beta-chloroethyl) vinylphosphonate;
Bis(beta-chloropropyl) vinylphosphonate;
Bis(beta-chloroethyl) 1-methylvinylphosphonate;
Bis(beta-chloroethyl) 1-cyanovinylphosphonate;
Bis(beta-chloroethyl) 1-chlorovinylphosphonate;
Bis(beta-chlorethyl) 1-phenylvinylphosphonate;
Dimethyl vinylphosphonate;
Diethyl vinylphosphonate;
Bis(omega-chlorobutyl) vinylphosphonate;
Di-n-butyl vinylphosphonate;
Di-isobutyl vinylphosphonate;
Bis(2-chloroisopropyl) 1-methylvinylphosphonate;
Diphenyl vinylphosphonate; and
Bis(2,3-dibromopropyl) vinylphosphonate.

From the above group of bis(hydrocarbyl) vinylphosphonate monomers, it is preferred to employ bis(beta-chloroethyl) vinylphosphonate in preparing the novel aqueous emulsion copolymers of this invention since the latter monomer is a commercially available material and lower in cost than any of the other bis(hydrocarbyl) vinylphosphonates. For the same reasons, it is preferred to employ vinyl chloride as the halogen containing ethylenically unsaturated monomer in these aqueous emulsion copolymers. It is to be noted, at this point, that the use of the term "copolymer" in this disclosure is meant to apply to polymers derived from two, three or more distinct monomer species.

In addition to the above described bis(hydrocarbyl) vinylphosphonates, it is also possible to prepare aqueous emulsion copolymers useful as flame retardant additives for ordinarily flammable polymer substrates by employing: (1) mono(alkyl) acid vinylphosphonates such, for example, as mono (ethyl) hydrogen vinylphosphonate, mono(butyl) hydrogen vinylphosphonate, mono(octyl) hydrogen vinylphosphonate; mono(-beta-chlrorethyl) hydrogen vinylphosphonate, mono(omega-chlorooctyl) hydrogen vinylphosphonate; (2) mono(cycloalkyl) and mono(aryl) hydrogen vinylphosphonates such, for example, as mono(cyclohexyl)hydrogen vinylphosphonate, mono(phenyl) hydrogen vinylphosphonate, mono(benzyl) hydrogen vinylphosphonate; (3) bis(cycloalkyl) and bis(aryl) vinylphosphonates, such, for example, as bis(cyclohexyl) vinylphosphonate and bis(benzyl) vinylphosphonates; and, (4) bis(alkyl), bis(cycloalkyl), and bis(aryl) allylphosphonates such, for example, as bis(beta-chloroethyl) allylphosphonate, bis(cyclohexyl) allylphosphonate and bis(benzyl) allylphosphonate as well as mixtures of any two or more of the above described phosphonate monomers.

The aqueous emulsion or latex copolymers of this invention may also, if desired, contain one or more optional comonomers including alpha-olefins such as ethylene, propylene and butylene; vinyl esters of carboxylic acids such as vinyl acetate, vinyl butyrate, and vinyl stearate; ethylenically unsaturated monocarboxylic-acids such as acrylic and methacrylic acids; ethylenically unsaturated dicarboxylic acids, their anhydrides and their $C_1$–$C_{20}$ mono- and dialkyl esters such as aconitic acid, fumaric acid, maleic acid, itaconic acid, citraconic acid, maleic anhydride, dibutyl fumarate and monoethyl maleate; amides of ethylenically unsaturated carboxylic acids such as acrylamide and methacrylamide and their N-methylol derivatives such as N-methylol acrylamide and N-methylol methacrylamide; vinyl aryl compounds such as styrene and alpha-methyl styrene; nitriles of ethylenically unsaturated carboxylic acids such as acrylonitrile and methacrylonitrile; $C_1$–$C_{20}$ alkyl vinyl ethers such as methyl vinyl ether, ethyl vinyl ether and stearyl vinyl ether; dienes such as isoprene and butadiene; and, glycidyl esters of acrylic and methacrylic acid such as glycidyl acrylate and glycidyl methacrylate, etc. Preferred for use as optional comonomers are N-methylol acrylamide and N-methylol methacrylamide which serve to provide the resulting copolymer with cross-linking sites.

The above described copolymers may be prepared by means of free radical initiated emulsion polymerization techniques well known to those skilled in the art. In these procedures, the various monomers and catalysts are emulsified, in water, by means of one or more surface-active emulsifiers whereupon the polymerization reaction is then initiated. Suitable water soluble, free radical initiating catalysts for use in preparing the copolymer latices of this invention include sodium, potassium and ammonium persulfate and hydrogen peroxide or one may use a redox system such, for example, as a mixture of a persulfate with an alkali metal bisulfite, thiosulfate or hydrosulfite. These catalysts should be present in a concentration of from about 0.05 to 5.0%, by weight, of the total monomer charge. With respect to the emulsifier or surfactant, it is possible to utilize one or more anionic, cationic, or non-ionic emulsifiers such, for example, as the alkyl carboxylic acid salts; the alkyl sulfate, phosphate, or sulfosuccinate salts; the alkyl aryl ether alcohols, and the alkyl aryl polyether sulfate salts. The selected emulsifier or emulsifiers should be present in effective concentration of from about 0.03 to 6.0%, by weight, of the total monomer charge. In addition, a protective colloid such as polyvinyl alcohol, polyvinyl pyrrolidone, methyl cellulose or gelatin can also, if desired be present in the recipe in an effective concentration of from about 0.03 to 6.0%, by weight, of the total monomer charge. Alternatively, the protective colloid may be introduced into the copolymer latex subsequent to its preparation. When post-added in this manner, the protective colloid should be present in a concentration of from about 0.03 to 6.0%, by weight, of the total resin solids. In any event, the presence of the protective colloid serves to enhance the stability of the emulsion.

The actual polymerization reaction will ordinarily be conducted at a temperature of from about 0° to 100°C. for a period of from about 1 to 24 hours, depending upon such factors as the particular monomer, catalysts, surfactants and polymerization apparatus that is being utilized. The latices resulting from this polymerization process will ordinarily have a resin solids content of from about 5 to 70%, by weight, wherein the particles have a diameter which ranges in size from about 0.03 to 3.0 microns.

With respect to proportions, these aqueous emulsion or latex copolymer particles may contain from about 1 to 90%, by weight, of one or more of the above described bis(hydrocarbyl) vinylphosphonates with the balance of the copolymer comprising one or more of the above described halogen containing ethylenically unsaturated monomers together with from 0 to about 30%, by weight, of one or more of the above described optional comonomers. Optimum results, as flame retardant additives for ordinarily flammable polymer substrates are obtained by the use of copolymers containing from about 40 to 70% of one or more bis(hydrocarbyl) vinylphosphonates, preferably bis(beta-chloroethyl) vinylphosphonate.

It is to be noted, at this point, that the concentration of the bis(hydrocarbyl) vinylphosphonate in the copolymers of this invention is largely determinative of their subsequent mode of use. Thus, those copolymers containing about 40%, or higher, of the vinylphosphonate are soft materials readily capable of forming films under room temperature conditions. Accordingly, such copolymers can be used per se to prepare fire retardant coatings or they can be used as fire retardant additives which are readily blended with latices or emulsions of ordinarily flammable polymer substrates which are themselves film forming materials. On the other hand, when the aqueous emulsion copolymers of this invention contain less then about 40%, by weight, of the vinylphosphonate, they will ordinarily be har, non-film forming materials which are, therefore, particularly suited for being blended with flammable polymer substrates which are non-film forming. These non-film forming copolymers may also, if desired, be blended with ordinarily flammable, film forming polymer substrates especially after they have first been spray dried and thereby converted into a dry, particulate form.

With respect to the above described proportions for the composition of the aqueous emulsion or latex copolymers of this invention, it has been found that it becomes increasingly more difficult to attain good polymerization conversion rates as attempts are made to increase the amount of the bis(hydrocarbyl) vinylphosphonate in the resulting copolymer substantially above a concentration of about 60%, by weight. On the other hand, the use of these copolymer emulsions as flame retardant additives for ordinarily flammable polymer substrates becomes progressively more inefficient when they contain substantially less than about 5%, by weight, of one or more bis(hydrocarbyl) vinylphosphonates since the resulting blend will then require the presence of a rather high concentration of the copolymer in order to attain flame retardancy. The use of such high concentrations of these copolymer additives may, in turn, result in some deterioration in the inherent physical properties of the thus modified polymer substrate.

Specific aqueous emulsion copolymer compositions which have been found to provide particularly good results as additives for the preparation of fire retardant polymer composition are:

1. A copolymer of 40%, by weight, of vinyl chloride and 60%, by weight, of bis(beta-chloroethyl) vinylphosphonate;
2. A copolymer containing 60%, by weight, of bis(-beta-chloroethyl) vinylphosphonate, 37%, by weight, of vinyl chloride and 3%, by weight, of N-methylol acrylamide; and,
3. A copolymer containing 60%, by weight, of bis(-beta-chloroethyl) vinylphosphonate and 40%, by weight, of vinyl bromide.

It is important, with respect to this disclosure, to distinguish between the processes of suspension and emulsion polymerization. Thus, suspension polymerization refers to a method of polymerization whereby one or more monomers is dispersed in a suspension medium which is a non-solvent for both the monomer and the resulting polymer. Generally water is utilized for this purpose and a monomer soluble polymerization initiator is thereupon introduced. Polymerization takes place within the monomers phase containing the polymerization initiator. The use of the suspending medium assists in the dissipation of the heat of reaction and the polymerization reaction is therefore easier to control. Suspension polymerization is generally accomplished by dispersing the monomer in the suspending medium either by constant agitation or by the use of a suspending agent or both. Various suspending agents are known in the art. These known suspending agents include gelatine, hydroxy methyl cellulose, hydroxy ethyl cellulose, hydroxy propyl cellulose, carboxy methyl cellulose, talc, clay polyvinyl alcohol and the like.

By contrast, emulsion polymerization involves a process whereby one or more monomers are emulsified in the form of droplets within a continuous phase which should be inert with respect to both the emulsified monomers and the resulting polymer. Water is generally selected as the continuous phase. Emulsification of the monomers is facilitated by the use of one or more emulsification agents which tend to reduce the interfacial tension between the dispersed and continuous phases. Typical emulsifiers include common soaps, salts of long-chain carboxylic and sulfonic acids, alkylated aromatic sulfonic acids and salts of long-chain amines.

A water soluble initiator is employed and it is believed that the polymer chains originate in the continuous, aqueous phase and then continue their growth in the dispersed monomer-polymer phase yielding the polymer product in a finely divided state which remains emulsified within the continuous, aqueous medium. Thus, an important distinction between emulsion and suspension polymerization is that in the former, the monomer is either dispersed into droplets which are stabilized by an adsorbed layer of soap molecules or is solubilized in the soap micelle which is present in aqueous soap solutions. As a result, stable polymer emulsions are readily obtained whereas, in a suspension polymerization, the resulting polymer particles are of a relatively larger mass which tend to more readily separate out from the suspension.

In all cases, the novel aqueous emulsion or latex copolymers of this invention have been found to provide blends with ordinarily flammable polymer substrates which are characterized by their outstanding fire retardancy. As used in this disclosure, the term "fire retardant" or "flame retardant" is intended to refer to that particular property of a material which provides it with a degree of resistance to ignition and burning. Thus, a fire or flame retardant composition is one which has a low level of flammability and flame spread. This property may be conveniently evaluated by means of any of the standard flame retardancy tests such, for example, as the ASTM test D-635.

As has been indicated, hereinabove, the aqueous emulsion or latex copolymers of this invention are particularly suitable for blending with ordinarily flammable polymers which are in the form of aqueous systems such as solutions, suspensions, or, most preferably, emulsions. The resulting aqueous blends may then be used in any of the various coating, adhesive, laminating and impregnating applications known to those skilled in the art. Thus, these aqueous blends may be coated upon and/or absorbed by all types of substrates to which it is desired to impart fire retardant properties. They may, therefore, be used as coatings, impregnants, fillers, laminants, and adhesives for such substrates as wood; paper; metals; textiles based on either fibers or blends thereof; synthetic polymer films such as those based upon polyolefins, regenerated cellulose, i.e. cellophane, polyvinyl chloride, polyesters and the like; leather natural and synthetic rubber; fiber-board; and synthetic plastics prepared by means of either addition or condensation polymerization techniques. In addition, the copolymers of this invention may be employed as fire retardant additives in the spinning baths or dopes from which rayon and acrylic fibers are spun.

Any desired polymer substrates may be blended with the above described bis(hydrocarbyl) vinylphosphonate copolymer additives in order to prepare fire retardant compositions. Such polymer substrates include:

1. Polymers of vinyl chloride including polyvinyl chloride and the random and graft copolymers of vinyl chloride with a minor proportion of one or more of the above described group of vinyl monomers which were listed as optional comonomers for use in preparing the aqueous emulsion copolymers of this invention;

2. Polymers of the $C_1$–$C_8$ alkyl acrylates and methacrylates including their homopolymers and their copolymers with each other and with a minor proportion of such comonomers as the alpha-olefins, e.g. ethylene and propylene; the vinyl esters of carboxylic acids, e.g. vinyl acetate; ethylenically unsaturated monocarboxylic acids, e.g. acrylic and methacrylic acids; ethylenically unsaturated dicarboxylic acids their anhydrides and their $C_1$–$C_{20}$ mono- and dialkyl esters, e.g. maleic acid, maleic anhydride, diethyl maleate and monobutyl acid maleate; vinylidene halides, e.g. vinylidene chloro; $C_1$–$C_{20}$ alkyl vinyl ethers, e.g. methyl vinyl ether; amides of ethylenically unsaturated monocarboxylic acids, e.g. acrylamide; vinyl aryl compounds, e.g. alpha-methyl styrene and styrene; and, nitriles of alpha, beta-ethylenically unsaturated carboxylic acids, e.g. acrylonitrile and methacrylonitrile;

3. Polymers of nitriles of ethylenically unsaturated acids including polymethacrylonitrile, polyacrylonitrile and the copolymers of methacrylonitrile and acrylonitrile with a minor proportion of one or more vinyl monomers such as the lower alkyl acrylates and methacrylates, styrene and alpha-methyl styrene;

4. Acrylonitrile-butadiene-styrene resins, commonly referred to as "ABS" resins, which generally comprise either a mixture of a 60 to 80:40 to 20 styrene:acrylonitrile copolymer with from about 10 to 40%, by weight, of a 5 to 40:95 to 60 acrylonitrile-butadiene copolymer or a mixture of a 60 to 80:40 to 20 styrene:acrylonitrile copolymer with from about 10 to 40%, by weight, of a graft of the latter copolymer onto polybutadiene;

5. Poly(alpha-olefins) such as polypropylene and polyethylene and copolymers of one or more alpha-olefins, such as ethylene or propylene, with a minor proportions of one or more ethylenically unsaturated monomers including 4-methyl pentane-1, butene-1, norbornene and its derivatives; cyclopentadiene, cyclopentene, cyclobutene, vinyl acetate, the $C_1$–$C_{12}$ alkyl acrylate and methacrylate esters, as well as blends of the homo- and copolymers of aplha-olefins with other types of thermoplastic polymers;

6. Polymers of styrene including polystyrene, poly(alpha-methyl styrene) and poly(tertiary butyl styrene) and copolymers of styrene, alpha-methyl styrene or tertiary butyl styrene with a minor proportion of one or more ethylenically unsaturated comonomers such, for example, as nitriles of ethylenically unsaturated carboxylic acids including acrylonitrile and methacrylonitrile; $C_1$–$C_{12}$ alkyl esters of acrylic and methacrylic acids such, for example, as methyl methacrylate and 2-ethylhexyl acrylate; and, graft copolymers of styrene, tertiary butyl styrene or alpha-methyl styrene with polybutadiene and other hydrocarbon elastomers;

7. Cellulosic resins including cellulose esters and mixed esters such, for example, as cellulose nitrate, cellulose acetate-butyrate, cellulose acetate-propionate and cellulose ethers such, for example, as ethyl cellulose;

8. Polyamide resins, i.e. the resins made by the condensation of di- or polyamines with di- or polybasic acids or by polymerization of lactams or amino acids. Typical polyamides include nylon 4 which is made from pyrrolidone; nylon 6 obtained by polycondensation of caprolactam; nylon 66 obtained by the condensation of hexamethylene diamine with adipic acid; nylon 610 obtained by the condensation of hexamethylenediamine with sebacic acid; nylon 7 which is a polymer of ethyl aminoheptanoate; nylon 9 made from 9-aminononanoic acid; and, nylon 11 made from 11-amino undecanoic acid;

9. Polyester resins, i.e. the resins produced by the condensation of saturated or unsaturated dibasic acids, such as terephthalic, maleic, fumaric, isophthalic, adipic and azelaic acids with dihydric alcohols such as ethylene glycol, propylene glycol, diethylene glycol and dipropylene glycol. Where the resin is made with an unsaturated acid, a polymerizable monomer such, for example, as styrene, vinyl toluene, diallyl phthalate, methyl methacrylate; chlorostyrene, alpha-methyl styrene, divinyl benzene or triallyl cyanurate is often included in the composition;

10. Polyurethane resins, i.e. the resins formed by the reaction between a bi- or polyfunctional hydroxyl containing compound, such as a polyether or polyester, and a di- or polyisocyanurate such as toluene diisocyanate or diphenylmethane-4,4'-diisocyanate;

11. Polycarbonate resins, i.e. the resins derived from the reaction between a difunctional alcohol or phenol, such as bis-phenol A, and phosgene or an alkyl or aryl carbonate;

12. Polyacetal resins, i.e. the resins derived from the anionic polymerization of formaldehyde to obtain a linear molecule of the type —O—$CH_2$—O—$CH_2$—O $CH_2$—;

13. Polyphenylene oxide resins made by the oxidative polymerization of 2,6-dimethylphenol in the presence of a copper-amine-complex catalyst;

14. Polysulfone resins, i.e. the resins containing an $SO_2$ linkage as derived from the reaction of sulfur dioxide with olefins such as 1-butene or, more preferably, the reaction of bis-phenol A with 4,4'-dichlorodiphenyl sulfone;

15. The acrylate:styrene:acrylonitrile resins, commonly referred to as "ASA" resins, which comprise copolymers containing a major proportion of a $C_2$–$C_8$ alkyl acrylate ester elastomer upon which is grafted about 65–95%, by weight of the latter copolymer, of a 70–80:30–20 styrene:acrylonitrile copolymer;

16. The methacrylate:styrene resins, commonly referred to as the "MBS" resins, which comprise a minor proportion of a methyl methacrylate:styrene:acrylonitrile terpolymer grafted and/or blended with either polybutadiene or a copolymer of butadiene and minor proportions of such comonomers as, for example, styrene and acrylonitrile;

17. Polymers of vinyl acetate including polyvinyl acetate and the random and graft copolymers of vinyl chloride with a minor proportion of one or more of the vinyl monomers which were listed as optional comonomers for use in preparing the aqueous emulsion copolymers of this invention; and, 18. Aminoplast resins made by the polycondensation of formaldehyde with a nitrogen containing compound such as urea or malamine; and 19. Phenolic resins made by the polycondensation of phenols with aldehydes such as formaldehyde, acetaldehyde or furfural aldehyde.

In effect, one may utilize any ordinarily flammable polymer substrate in preparing fire retardant polyblends with the novel aqueous emulsion copolymer additives of this invention. These ordinarily flammable polymer substrates may be thermoplastic polymers, i.e. polymers which can be softened by heat and which then regain their original properties on cooling. Also applicable are polymer systems, particularly those in aqueous emulsion form, comprising copolymers containing one or more crosslinkable comonomers, i.e. monomers containing two ore more functional groups, such, for example, as N-methylol acrylamide, N-methylol methacrylamide, glycidyl acrylate and glycidyl methacrylate. Thus, the copolymers containing one or more of these crosslinkable comonomers can be cured or crosslinked, by the use of heat and/or catalysts and are thereby converted into a form in which they will no longer be thermoplastic but will, rather, be thermosetting, i.e. they will not soften upon being heated. Ideally, the novel aqueous emulsion copolymer additives of this invention would be blended with such crosslinkable copolymer system prior to the time they undergo this curing or crosslinking operation.

The actual blending of the aqueous emulsion colopymer additives of this invention with the selected polymeric substrate, i.e. with any one or more of the above described polymers, may be accomplished by means of any convenient procedure which will result in an intimate admixture of the additive within the mass of the substrate polymer. Thus, for example, an aqueous emulsion or latex containing the particles of the copolymer additive may simply be blended or otherwise admixed with the substrate polymer which should, preferably, be in the form of an aqueous solution, latex or suspension. Or, if desired, the copolymer additive and the polymer substrate may be admixed while each is in the form of a solid powder.

The blending operation may also be carried out by means of a procedure in which the polymer which comprises the substrate is itself polymerized while in the presence of one of the previously polymerized aqueous emulsion copolymer additives of this invention. Alternatively, the bis(hydrocarbyl) vinylphosphonate containing aqueous emulsion copolymer additive may be polymerized in a system which contains the previously polymerized polymer substrate in an appropriate physical form, e.g. as an aqueous solution, suspension or emulsion.

With respect to proportions, the amount of bis(hydrocarbyl) vinylphosphonate containing aqueous emulsion or latex copolymer whic may be admixed with an ordinarily flammable polymer substrate will depend, primarily, upon such factors as the particular phosphonate copolymer and polymer substrate which are to be blended with one another, the degree of fire retardancy desired in the resulting blend, the degree of clarity, hardness and other specific physical properties which are sought as well as other technical and economic considerations known and understood by those skilled in the art. However, in order to attain a composition which will be self-extinguishing, it is generally desirable to introduce an effective concentration of bis(alkyl) vinylphosphonate aqueous emulsion copolymer solids which will be sufficient to provide the resulting blend with at least about 0.5%, by weight, of phosphorus and with at least about 10%, by weight, of halogen, i.e. chlorine and/or bromine, derived from the halogen containing ethylenically unsaturated monomer and also, if possible, from the bis(hydrocarbyl) vinylphosphonate.

The fire retardant polymer compositions of this invention can be prepared so as to contain various optional additives which may include plasticizers such as the alkyl esters of phthalic, adipic and sebacic acids such, for example, as dioctyl phthalate and ditridecyl phthalate and aryl phosphate, esters such, for example, as triphenyl and tricresyl phosphate, etc.; lubricants and mold release agents such as stearic acid or its metal salts, petroleum based waxes, mineral oils, polyethylene waxes, etc.; and heat and light stabilizers such as barium, cadium, calcium, zinc soaps or phenates, basic lead compounds, organo-tin compouns, such as dialkyl tin mercaptides and dialkyl tin maleates, thiolauric anhydride and n-butyl stannoic acid, epoxidized oils, alkyl diphenyl phosphites, triaryl phosphites, phenyl salicylates, o-hydroxy benzophenones and benzotriazoles, etc. For a more complete listing of plasticizers, lubricants, stabilizers and other functional additives, one may consult "Polyvinyl Chloride" by H. A. Sarvetnick published by Van Nostrand Reinhold Co., New York, N.Y., in 1969.

The compositions of this invention may also contain fillers, pigments, dyes, opacifying agents, decorative additives such as reflective metal foils or flakes, and other imbedded solid objects such as fiber glass, textile fibers, paper, and the like, provided that they do not detract from the flame retardancy of these products. In addition, the compositions may contain other flame retardants such as antimony compounds, halogenated alkyl phosphates or phosphonates, alkyl acid phosphates, or small concentrations of phosphoric acid.

The novel fire retardant composition of this invention, comprising blends of any of the above described polymer substrates with one or more of the novel aqueous emulsion, fire retardant additives of this invention, may be utilized in any of the coating, adhesive, impregnating, laminating, binding and painting applications known to those skilled in the art wherein it is desired to provide fire retardancy to the resulting end product. For example, these compositions may be used in such applications as rug and carpet backing adhesives, as adhesives for fiber glass, as a backing coating for fabrics, as heat sealable binders for non-woven fabrics, as flooring, coatings, as paper coatings, as paint bases and as adhesives for preparing laminated structures.

In addition to being used as fire retardant additives for the preparation of fire retardant polyblends with flammable polymer substrates, the aqueous emulsion copolymer additives of this invention may be used, per se, in any of the various coating, painting adhesive, laminating, impregnating and binding applications known to those skilled in the art. Thus, they may be coated upon and/or absorbed by all types of substrates to which it is desired to impart fire retardant properties.

They may, therefore, be used as coatings, impegnants, fillers, laminants, and adhesives for such substrates as wood; paper; metals; textiles based on either natural or synthetic fibers or blends thereof; synthetic polymer films such as those based upon polyolefins, regenerated cellulose, i.e. cellophane, polyvinyl chloride, polyesters and the like; leather; natural and synthetic rubber; fiberboard; and, synthetic plastics prepared by means of either addition or condensation polymerization techniques.

The following examples will further illustrate the embodiment of this invention. In these examples, all parts given are by weight unless otherwise noted.

EXAMPLE I

This example illustrates the preparation of a bis(hydrocarbyl) vinylphosphonate aqueous emulsion copolymer as well as its subsequent use in preparing a fire retardant polymer composition.

Into a 32 ounce reaction vessel, there are charged 180 gms of bis(beta-chloroethyl) vinylphosphonate, hereinafter referred to as "bis-beta," 60 gms of a 10%, by weight, aqueous solution of sodium lauryl sulfate, 120 gms of a 5%, by weight, aqueous solution of polyvinyl alcohol having a degree of hydrolysis of 80–85% and 80 gms of deionized water. The pH of the resulting mixture is adjusted to a value of 9 by the addition of 3.0 gms of a 58%, by weight, aqueous solution of ammonium hydroxide whereupon 40 gms of a 10%, by weight, solution of ammonium persulfate are added.

The vessel is sealed and then chilled for 1½ hours in a freezer whereupon 120 gms of vinyl chloride are introduced. The vessel is resealed and the mixture is heated for 12 hours at 50°C. while being rotated at 20 rpm. Upon completing the reaction, the vessel is cooled until it reaches ambient temperature. In this manner virtually 100% conversion of the monomers into a 60:40 bis-beta:vinyl chloride aqueous emulsion copolymer is obtained. This emulsion has a resin solids content of about 50%, by weight, with the copolymer particles having an average diameter of about 0.06–0.19 microns. Analysis of these copolymer particles reveals that they contain 8.02% P and 36.5% Cl.

This emulsion is then blended with an aqueous emulsion containing 46%, by weight, of polybutyl acrylate polymer particles whose films are ordinarily flammable. A number of such blends are prepared in which the concentrations of the bis-beta copolymer solids are, respectively, 5, 10, 20 and 30%, by weight, as based on the polybutyl acrylate polymer solids. Films having a dry thickness of 5–10 mils are cast from each of these polymer mixtures and the flame retardancy of these films is then quantitatively evaluated by determining their Limiting Oxygen Index (LOI) by means of the procedure of ASTM D-2863 which is also described by Fenimore and Martin in the November, 1966, issue of Modern Plastics. In brief, this procedure directly relates flame retardancy to a measurement of the minimum percentage concentration of oxygen in an oxygen:nitrogen mixture which permits the sample to burn; the LOI being calculated as follows:

$$LOI = \frac{[O_2]}{[O_2] + [N_2]} \times 100$$

Thus, a higher LOI is indicative of a higher degree of flame retardancy.

The following table presents the results of this evaluation:

| Concentration of Bis-Beta Copolymer Solids in Film (%) | LOI |
|---|---|
| 0 | 17.3 |
| 5 | 18.4 |
| 10 | 19.7 |
| 20 | 21.9 |
| 30 | 23.4 |

The above data reveal how the use of the novel copolymer additives of this invention enhances the fire retardance of films derived from a polymer which is ordinarily flammable.

Comparable results are also obtained by the use as flame retardant additives of:

1. a 60:37:3 (by weight) bis-beta:vinyl chloride:N-methylol acrylamide copolymer and
2. a 60:40 (by weight) bis-beta:vinyl bromide copolymer.

Variations may be made in proportions, procedures and materials without departing from the scope of this invention as defined by the following claims.

What is claimed is:

1. An aqueous emulsion copolymer consisting of: (1) from about 1 to 90%, by weight, of at least one bis(hydrocarbyl) vinylphosphonate having the structure:

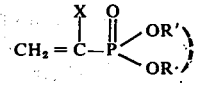

wherein X is selected from the group consisting of hydrogen, halogen, cyano, aryl, $C_1$–$C_{18}$ alkyl and

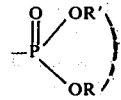

wherein R and R' are hydrocarbyl and substituted hydrocarbyl groups having non-interfering substitutents, said hydrocarbyl and said substituted hydrocarbyl groups containing up to about 18 carbon atoms inclusive with the proviso that R and R' can be the same, different, or conjoint and (2) the balance being at least one halogen containing, ethylenically unsaturated compound selected from the group consisting of the vinyl halides and the vinylidene halides.

2. A copolymer as claimed in claim 1 wherein the vinyl halide is selected from the group consisting of vinyl chloride, vinyl fluoride and vinyl bromide.

3. A copolymer as claimed in claim 1 wherein the vinyl halide is vinyl chloride.

4. A copolymer as claimed in claim 1 wherein said copolymer contains about 40% to 70% of said bis(hydrocarbyl) vinylphosphonate.

5. A copolymer as claimed in claim 4 wherein said bis(hydrocarbyl)vinylphosphonate is bis(beta-chloroethyl)vinylphosphonate.

6. A copolymer as claimed in claim 1 wherein said bis(hydrocarbyl)vinylphosphonate is bis(beta-chloroethyl)vinylphosphonate.

7. A copolymer as claimed in claim 1 comprising about 40–70% of bis(beta-chloroethyl)vinylphosphonate with the remainder being vinyl chloride.

* * * * *

UNITED STATES PATENT OFFICE
CERTIFICATE OF CORRECTION

Patent No. 3,935,149     Dated January 27, 1976

Inventor(s) Paul Kraft et al.

It is certified that error appears in the above-identified patent and that said Letters Patent are hereby corrected as shown below:

The term of this patent subsequent to March 9, 1993, has been disclaimed.

Signed and Sealed this twenty-second Day of June 1976

[SEAL]

Attest:

RUTH C. MASON
*Attesting Officer*

C. MARSHALL DANN
*Commissioner of Patents and Trademarks*